US006854117B1

(12) United States Patent
Roberts

(10) Patent No.: US 6,854,117 B1
(45) Date of Patent: Feb. 8, 2005

(54) PARALLEL NETWORK PROCESSOR ARRAY

(75) Inventor: Lawrence G. Roberts, Woodside, CA (US)

(73) Assignee: Caspian Networks, Inc., San Jose, CA (US)

(*) Notice: Subject to any disclaimer, the term of this patent is extended or adjusted under 35 U.S.C. 154(b) by 825 days.

(21) Appl. No.: 09/703,196

(22) Filed: Oct. 31, 2000

(51) Int. Cl.[7] .......................... G08F 9/00; H04L 12/28
(52) U.S. Cl. ................. 718/102; 718/100; 370/412; 370/419; 370/410; 370/428; 370/392; 709/238
(58) Field of Search ................. 718/102, 100, 718/101, 103, 104, 105; 370/401, 412, 419, 428, 235, 235.1, 392; 709/238

(56) References Cited

U.S. PATENT DOCUMENTS

| | | | | |
|---|---|---|---|---|
| 5,421,019 | A | 5/1995 | Holsztynski et al. | 395/800 |
| 5,917,821 | A | 6/1999 | Gobuyan et al. | 370/392 |
| 6,172,990 | B1 * | 1/2001 | Deb et al. | 370/474 |
| 6,226,267 | B1 * | 5/2001 | Spinney et al. | 370/235 |
| 6,430,184 | B1 * | 8/2002 | Robins et al. | 370/392 |
| 6,522,188 | B1 * | 2/2003 | Poole | 327/407 |
| 6,646,390 | B2 * | 11/2003 | Grabner et al. | 315/225 |
| 6,714,553 | B1 * | 3/2004 | Poole et al. | 370/412 |

OTHER PUBLICATIONS

Trading Packet headers for packet processing, Girish P. Chandranmenon, George Varghese, ACM SIGCOMM Computer Communication Review, Proceedings of the Conference on Apps., techs., Archts., and prots. for computer commns., vol. 25 Issue 4, Oct. 1995.*

* cited by examiner

Primary Examiner—Majid A. Banankhah
(74) Attorney, Agent, or Firm—Fenwick & West LLP

(57) ABSTRACT

A method and system performs parallel processing of asynchronous processes on ordered entities. A system focuses on the average time and variance of the variable time process. Each processor can run multiple contexts. The processing may be divided into a number of stages, each of which can be performed by each of the processors. A system also needs to ensure that the order of the entities is preserved as desired. This order may be maintained by performing some type of pre-processing on the entities to determine their order, and then not starting processing on an entity until the processing of any entity which must precede that entity has been completed. For processing of packets in a network, it may be needed to ensure that packets in the same flow maintain their order after processing. A system also may determine the number of processors that optimally are needed in order to process an incoming stream of entities at a desired speed. This computation may depend on how many different contexts each processor runs. In addition, this computation also may depend on whether there is an input buffer available to store the incoming entities, and the capacity of such an input buffer.

7 Claims, 10 Drawing Sheets

PARALLEL NETWORK PROCESSOR ARRAY

CROSS REFERENCE TO RELATED APPLICATIONS

This application is related to U.S. patent application Ser. No. 09/552,278, entitled "Micro-Flow Management," filed on Apr. 19, 2000, by Lawrence G. Roberts, which is hereby incorporated by reference in its entirety.

BACKGROUND

Technical Field

The present invention relates generally to increasing the speed of processing data traveling over the Internet, and more particularly to parallel processing of data.

BACKGROUND OF THE INVENTION

As a result of continuous advances in technology, there has been an explosive growth of the Internet. Huge amounts of data are now sent over the Internet on a regular basis. In addition, the data traveling over the Internet includes not only text, but also images, audio and video data.

Both the quantity of the data being transported, as well as some of the different types of data being transported, requires very high speed data transmission over the Internet. The Internet is now being used for business-to-business transactions, for business-to-customer transactions, and individual-to-individual communications. Because the Internet currently is based on shared bandwidth, the large quantities of data being transported over the Internet result in slower speeds for data processing. However, delays in the processing of data often are not acceptable to users of the Internet. In addition, in the case of linear program information, such as audio or video data, a delay in data transmission often causes an unacceptable deterioration in the continuation of the linear program.

Therefore, there exists a need for very high speed data-processing within the Internet. One constraining factor, however, has been that several of the processes involved in data processing on the Internet take a variable amount of time to complete. Incoming data packets can take a variable amount of time to process for several reasons, for example, because of the variable sizes of the data packets, or because of extra processing required to be performed on some packets. In addition, burst memories cause packets to arrive in a continuous burst. Further, certain types of processing such as performing a lookup in a hash table, or accessing memory on a chip, intrinsically take a variable amount of time.

Conventionally, variations in the time required for data processing have presented problems for designers of integrated circuit chips and associated networks, because of the uncertainties in the times taken to process data. Networks and chips, therefore, are conventionally designed to tolerate the maximum possible processing time required for any single packet. However, allocating the maximum possible processing time for packets results in much slower networks and integrated circuit chips.

For this reason, some of the variable time processes have been performed only at the periphery of the Internet where the data traffic is less dense, and generally have not been performed at the core of the Internet. In the example of a lookup in a hash table mentioned above, the hashing of IP packets has been performed at the periphery of the Internet, rather than at the core of the Internet, because the time required for looking up a packet in a hash table can vary substantially, and can potentially be very long, which is unacceptable at the core of the Internet. Because network and integrated circuit chip designs conventionally allow for the maximum tolerable processing time, the look up in the hashing tables cannot be performed fast enough at the core of the Internet, where the traffic flow is very high.

One conventional method by which processing can be performed on data packets within a chip as well as within a network is illustrated in FIG. 1. According to this conventional method, all the processing on one data packet is completed before starting processing on another packet. FIG. 1 illustrates this method in the two dimensions of time along the horizontal axis, increasing from the left to the right, and of which packet is being processed along the vertical axis. As can be seen in FIG. 1, only Processor 1 is employed in such a method. Packet 1 is processed using Processor 1. Packet 2 is processed only after all the processing on the first packet has been completed, and Processor 1 is again available.

Another conventional method by which processing can be performed on data packets is illustrated in FIG. 2, and is based on a pipeline approach. This involves dividing the processing of the packets into several segments or phases. This method employs several processors, one for each of the phases. Once again, in FIG. 2, the horizontal axis represents time, and the vertical axis represents the packet being processed.

In this conventional method, each phase is assigned to a specific processor. In this pipeline approach, each processor is designed to perform a specific part of a repetitive function (e.g., for a microprocessor this could be instruction fetch, Arithmetic Logical Unit (ALU), branch calculation, load/store). Every instruction goes through the same set of steps, with varying processing time.

For instance, in FIG. 2, the processing to be performed on each packet is divided into five phases. Phase 1 is processed by Processor 1, Phase 2 is processed by Processor 2, Phase 3 is processed by Processor 3, Phase 4 is processed by Processor 4, and Phase 5 is processed by Processor 5.

In this conventional pipeline method, the first packet, Packet 1, is processed through Processor 1. As soon as Packet 1 completes the first phase of processing and moves on to Phase 2, the second packet, Packet 2, can start being processed using Processor 1. In one embodiment, in order for this pipeline approach to work smoothly, each phase of the processing must be allocated an equal amount of time. If, as above, "M" is the maximum tolerable time within which a packet must be completely processed, each of these phases can be allocated no more than a time of "M" divided by the number of phases. In the case described in FIG. 2, each phase can be allocated no more time than M/5.

One problem with the above-described conventional method is that the maximum tolerable time within which a packet must be processed (i.e. "M") remains the upper bound for the time required to process each and every packet of data. Although there is some statistical gain made with the pipeline approach (since such an approach can take advantage of the variability in processing time at each phase), the pipeline is limited by the number of discrete phases that can be logically defined. This is a problem if the average operation time (instruction execution time or packet transmission time) is greater than the sum of the maximum number of phases. That is, in general, for both of the above conventional methods, if $t_1$ is the time taken to process Packet 1, $t_2$ is the time taken to process Packet 2, and so on, with $t_n$ being the time taken to process Packet n, then conventional systems require that:

$$t_1<=M; t_2<=M; \ldots ; \text{and } t_n<=M \qquad \text{Eqn. (1)}$$

where $t_i$=the amount of time taken to process a packet i, where i=1, 2, ... n, and M=the maximum amount of time that it could take to process a packet.

In conventional systems, therefore, variable time processes for processing packets pose a problem because conventional systems account for the maximum possible time that can be taken by an asynchronous process, without accounting for the expected value of processing time, and without accounting for the variance in the length of the process. Therefore, processes for which M is large become increasingly unfeasible to implement.

A problem for variable time processes used in processing packets is that the order in which the packets comprising a flow come into the processing unit must be maintained. In other words, the ordering of packets in a flow is important, and different packets cannot be interchanged in order during the processing. A first packet in a flow may enter a processor followed by a second packet in the same flow. However, because of the asynchronous nature of the processing, if the second packet may be processed before the first packet, then this would create a problem because the ordering of the packets in the flow would be disturbed. Thus, because each packet takes a variable amount of time to process, any system, which attempts to process multiple packets in parallel, is faced with the additional challenge of keeping the packets in order.

It should be noted that the above-mentioned problems exist not only for processing of successive packets, but also for asynchronous processing of any entities whose order needs to be maintained. For example, these problems exist in most general purpose instruction processing systems, and in several assembly line type processing systems.

Thus, there exists a need for a system and method for performing variable time processes on ordered data packets at high speed, while still maintaining the order of the data packets being processed.

SUMMARY OF THE INVENTION

The method and system of the present invention provide parallel processing of asynchronous processes on ordered entities, such as data packets. By processing a number of entities in parallel on multiple processors, the present invention takes advantage of the average time and variance of the variable time process, and thus can avoid accounting for the maximum possible time that the variable time process may take. The parallel processing of asynchronous processes on ordered entities is made possible, in one embodiment, by pre-processing the ordered entities to ensure that their order is preserved.

In one embodiment, each one of multiple processors can run multiple contexts. In another embodiment of the present invention, the processing may be divided into a number of stages, each of which can be performed by each of the processors.

A system in accordance with an embodiment of the present invention also ensures that the order of the entities is desirably preserved. In one embodiment, this order is maintained by performing pre-processing on the entities to determine their order, and then not starting processing on an incoming entity until the processing of any entity, which must precede the incoming entity, has been completed.

For instance, in processing data packets in a network in one embodiment of the present invention, it may be desirable to ensure that packets in the same micro-flow (e.g., a specific transmission between a source and a destination node on a network) maintain their order. In one embodiment, pre-processing comprises performing a pre-hash on all of the packets that currently are being processed, and storing this information. The pre-hash then is performed on any incoming packet, and this pre-hash is compared to the stored information. If the hash on an incoming packet is the same as the hash on any of the packets that currently are being processed, it is assumed that the incoming packet belongs to the same flow as another packet currently being processed. In such a situation, processing on the incoming packet only is started when it is ascertained that no packet in the same micro-flow currently is being processed.

BRIEF DESCRIPTION ON OF THE DRAWINGS

DETAILED DESCRIPTION OF EMBODIMENTS OF THE PRESENT INVENTION

Embodiments of the present invention now are described with reference to figures where like reference numbers indicate identical or functionally similar elements.

Figure 1:
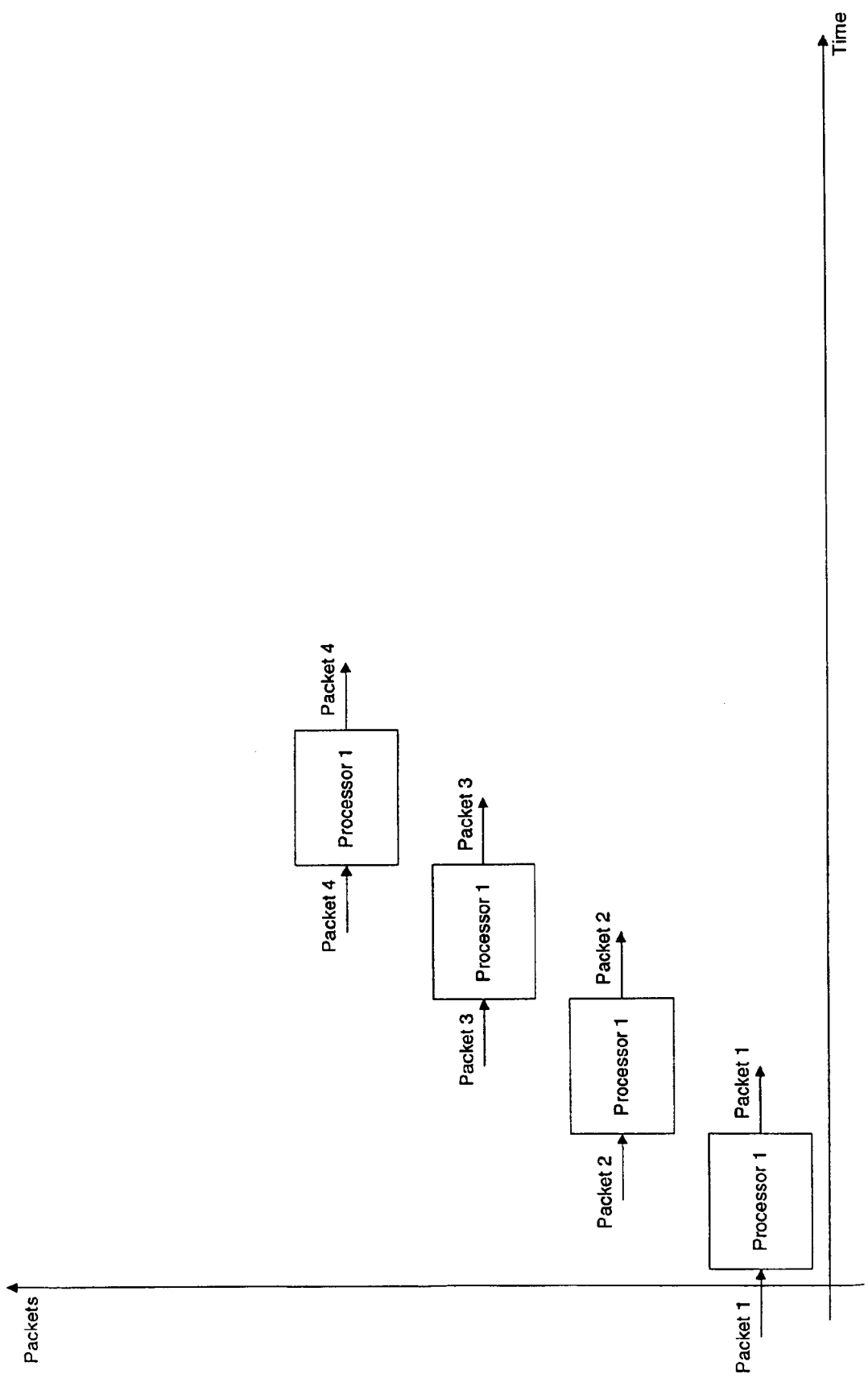
FIG. 1 is an illustration of a conventional system for processing entities.
Figure 2:
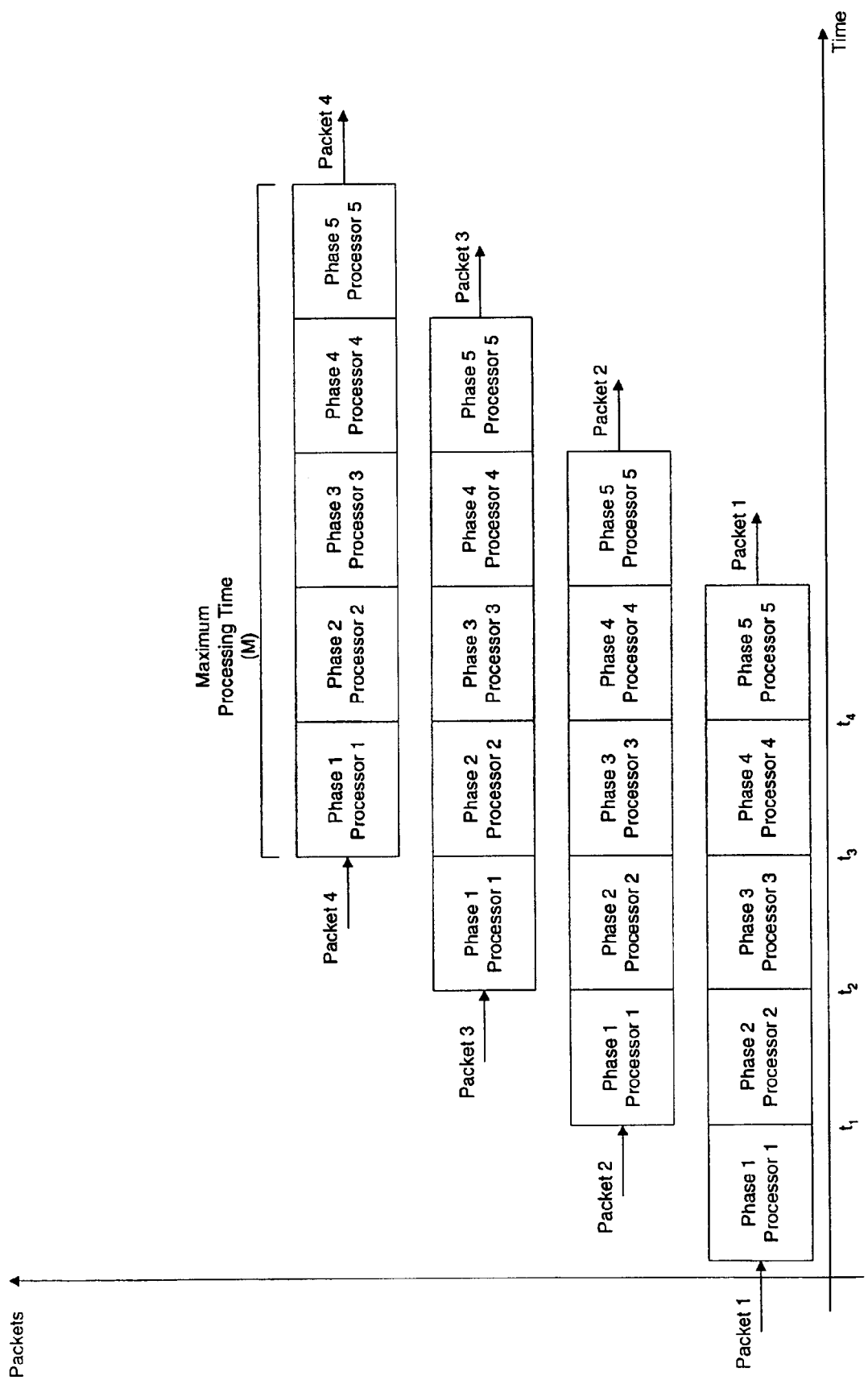
FIG. 2 is an illustration of a conventional system for processing entities, where the processing is divided into multiple phases.
Figure 3:
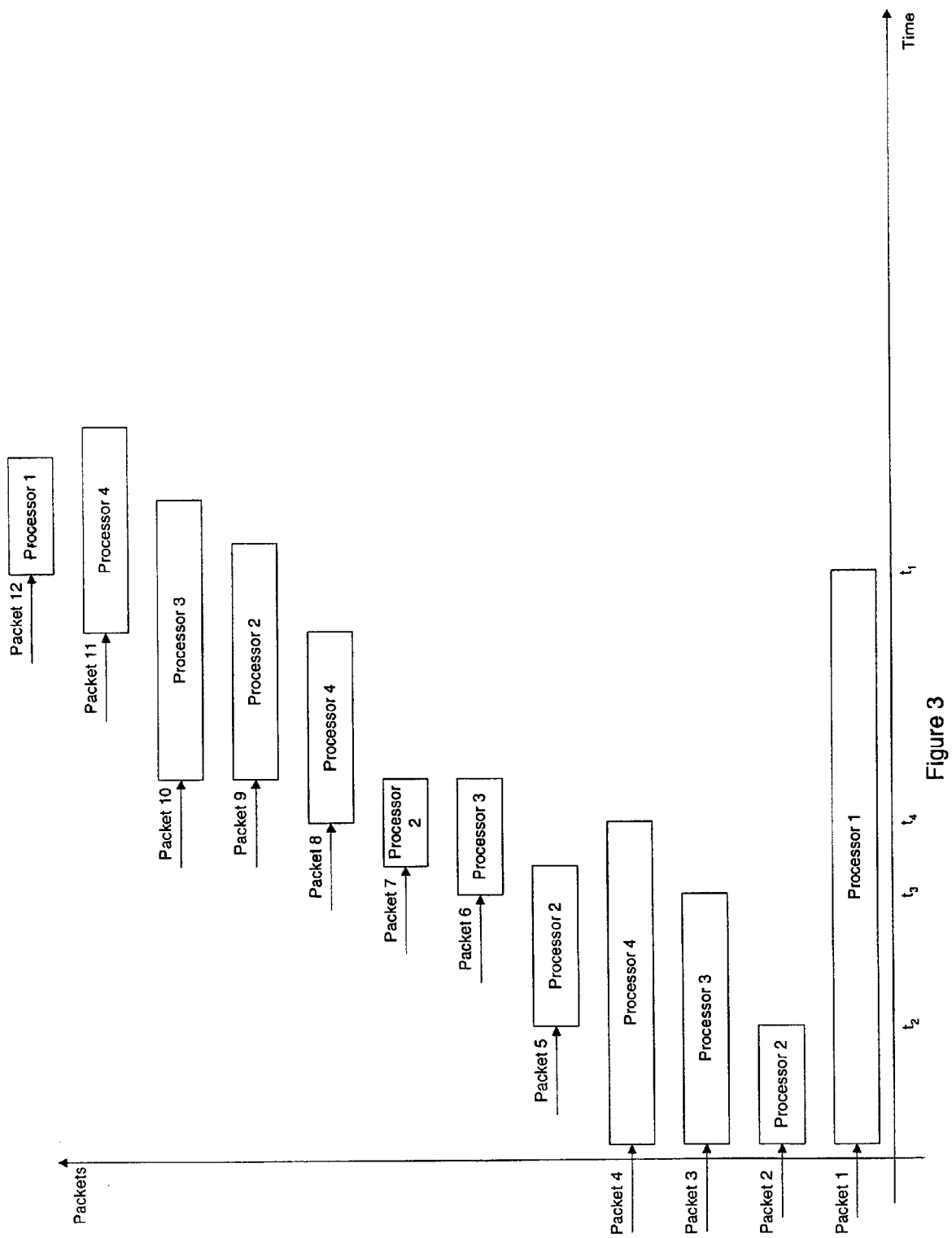
FIG. 3 is an illustration of a system with multiple processors in accordance with one embodiment of the present invention.

FIG. 3 illustrates an embodiment of the present invention where packets are processed in parallel. In this manner, the time taken for the execution of a variable time process often can have a significantly lower expected value than the maximum possible time required for a process to execute. In addition, an embodiment of the present invention can keep track of the packets within a data transmission that is transmitted from a certain source to a certain destination with specific quality of service state information attributed to it (e.g., a micro-flow) and does not permit a packet in this micro-flow to start being processed if another packet from the same micro-flow currently is being processed, as described in more detail below.

Figure 4:
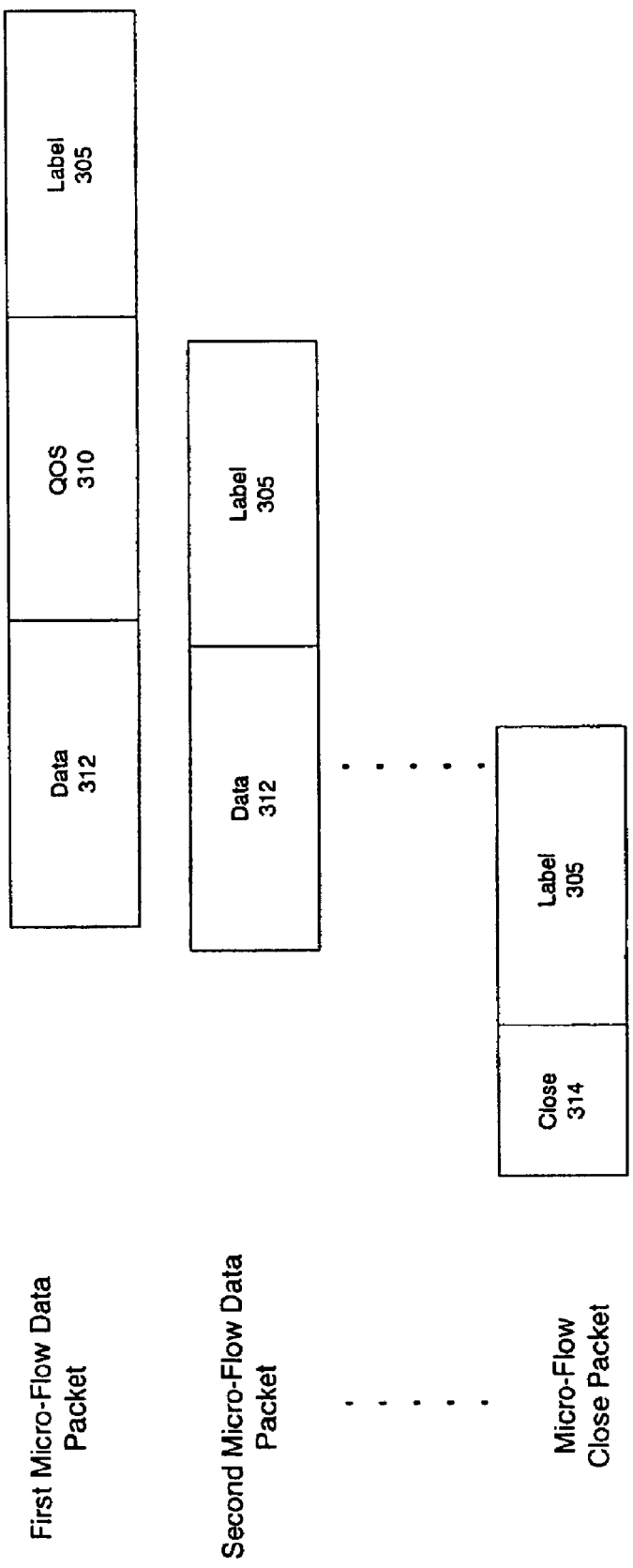
FIG. 4 illustrates a micro-flow in accordance with an embodiment of the present invention.

FIG. 4 illustrates a micro-flow of one embodiment of the present invention. In one embodiment, the micro-flow typically is a group of IP data packets including a first micro-flow data packet, at least one additional micro-flow data packet and a micro-flow close packet. The first micro-flow data packet includes a label field 305, a Quality of Service ("QoS") field 310 and a data field 312. The additional micro-flow data packets include the label field 305 and the data field 312, but not the QoS field 310. The micro-flow close packet includes the label field CD 305 and a close field 314. The close field 314 is used to instruct a switch to terminate an already established micro-flow that is present in the network.

The data field 312 can include a portion of or the entire content of the received data packet. This content can include a header (e.g., an IP header information) and data information associated with the received data packet. The label field 305 is responsible for enabling the network to differentiate the data packets of one micro-flow from the data packets of another micro-flow. In addition, the label field 305 is responsible for associating each micro-flow data packet with quantified QoS characteristics. This label field 305 specifically can represent a uniquely identifiable set of variables relating to the OSI model network layer (e.g., IPv4, IPv6) and transport layer (e.g., TCP, UDP) characteristics of the data packets of a single micro-flow. In one embodiment, the variables that are used to uniquely identify one micro-flow from another includes the protocol type, the source address, the destination address, the TCP/UDP source port number and the TCP/UDP destination port number associated with each data packet of the micro-flow. It should be noted that depending upon the type of data packet that is received by a switch, the information that is used to differentiate data packets of one micro-flow from another can be other types of information, such as the real time protocol ("RTP") type, MPLS or DiffServ identifiers, other information relating to a characteristic that is unique to the data packets of a specific micro-flow or a combination of this information. For further details regarding micro-flows, please refer to co-pending U.S. patent application Ser. No. 09/552,278 (now U.S. Pat. No. 6,574,195), entitled "Micro-Flow Management," which is hereby incorporated by reference herein.

Referring again to FIG. 3, in the embodiment of the present invention illustrated in FIG. 3, four processors are involved in the processing that is to be performed on the packets. The processing to be performed is not divided into phases. Packets 1–4 instead are assigned in parallel to Processors 1–4, respectively. Thus, in this instance, four packets start to be processed at the same time. The number of packets that can be processed in parallel is, in this embodiment of the present invention, equal to the number of processors employed by the system.

In FIG. 3, because variable time processes are involved, Packets 14 likely will complete processing at different times. FIG. 3 illustrates that Packet 2 is processed the fastest (in time $t_2$), Packet 3 takes a little longer to process (time $t_3$), Packet 4 takes a little longer still to process (time $t_4$), and Packet 1 takes the longest time to process (time $t_1$). The next packet, Packet 5, is assigned to the first available processor—in this instance, Processor 2, after it completes processing Packet 2 at time $t_2$. The next packet, Packet 6, is assigned to the next available processor—in this case, Processor 3 at time $t_3$, and so on. When a large number of packets are processed in parallel in this manner, the average time taken by the variable time process becomes the relevant metric, rather than the longest possible time taken by the variable process to complete. Thus, by processing several packets in parallel, this illustrative embodiment of the present invention has an average time for a packet to be processed being less than M, rather than having each and every packet being processed within M. In FIG. 3, as an example, M does not need to be greater than time $t_1$. All that is required is that $(t_1 + t_2 + t_3 + t4)/4 <= M$. Or more generally:

$$(t_1 + t_2 + \ldots + t_n)n <= M \qquad \text{Eqn. (2)}$$

where $t_i$ = the amount of time taken to process packet i, where i=1, 2, ... n n = the number of packets that can be processed in parallel employed by a system in accordance with this embodiment of the present invention, and M = the maximum time that it may take to process a packet.

Further, based upon the use of queuing theory, it can be shown that variance decreases with the square-root of the number of objects being processed. Thus, performing variable time processing on a large number of packets in parallel, decreases the variance.

In another embodiment of the present invention, also involving multiple processors, each processor is capable of running different "contexts." A context is the state information maintained for each packet process. A processor can start processing a packet. There then may be a length of time where the packet does not need the processor. This situation can occur, for instance, if the packet needs to access off-the-chip memory. In such a situation, the processor can store the context of the packet, and start processing another packet, until such time that the first packet is ready to use the processor again. In such an embodiment, the limit on the number of packets that can be processed in parallel is the number of processors multiplied by the number of contexts that each processor is capable of running. In one embodiment, each processor consists of a Reduced Instruction Set Computer (RISC) unit capable of running on four different contexts. Each context consists of a register file, a program counter register, and a subroutine stack. As packets arrive, they are placed in one of the register files of one of the processors. In one embodiment, the allocation of processors is done on a least used basis.

The availability of multiple contexts has the following advantages including: (1) while a register file is not being used for packet processing, the packet data can be loaded into that register file; (2) while a register file is not being used for packet processing, loading flow block data (e.g., a table entry, which stores state information, such as rate and delay variation information, regarding a micro-flow) that can be loaded into a register file, thus hiding memory latency and (3) while a register file is not being used for processing, storing packets and flow blocks from register files to memory, thereby hiding memory latency. A context manager can be used to manage the multiple contexts in each processor.

A second problem with respect to the use of asynchronous processes in processing network packets is maintaining the order of the packets within a micro-flow. It may happen that the first packet of a micro-flow may be assigned to a processor, and a second packet of the same micro-flow may be assigned to a different processor. Since the time taken to process each packet is variable, there is no guarantee that the processor that received the first packet will be ready to process the first packet before the processor that received the second packet processes the second packet. The second packet cannot be allowed to complete processing before the first packet without an issue of misordering developing, which may correct the data. In order to ensure that packets get processed in the correct order, they typically are pre-processed to establish a locking mechanism. In various embodiments of the present invention, this ordering problem is resolved by performing pre-processing on the packets to keep track of the packets in a single unique micro-flow, rather than establishing a locking mechanism. Based upon keeping track of the packets in each micro-flow, it is ensured that the processing of any packet in a micro-flow is not started when one of the packets in the micro-flow already is being processed. In this manner, later packets in a specific micro-flow can be ensured to not get processed faster than a previous packet in the same micro-flow, and thus the packets in a micro-flow do not get out of order.

Figure 5:
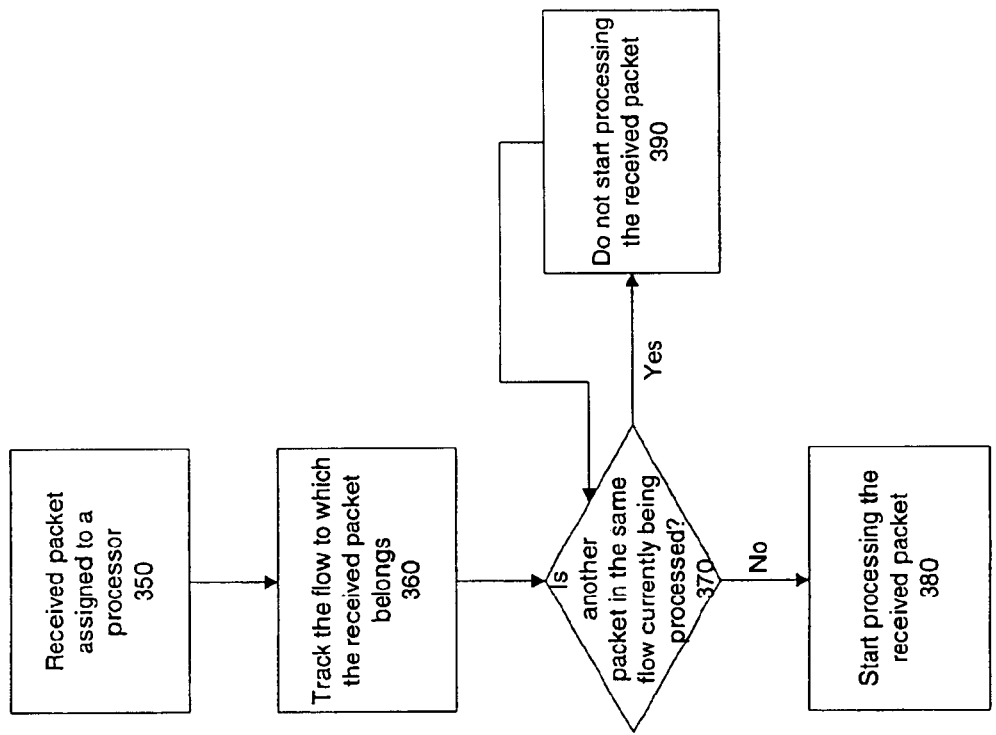
FIG. 5 is a flowchart illustrating an embodiment of the method of the present invention for maintaining the order of the entities.

As illustrated in the flowchart of FIG. 5, when a packet is received, the packet is assigned 350 to one of the multiple processors available for processing the packet. In particular, the packets can be assigned based upon processor load or upon assigning packets of the micro-flow to the same context. The micro-flow to which the packet belongs then is tracked 360. The micro-flow can be tracked based upon the hash key (e.g., tuple defining the micro-flow) or a hash value. Some pre-processing on the packet is performed to determine 370 whether another packet from the same micro-flow currently is being processed. If a packet from the same micro-flow is not already being processed, the processing of the received packet is started 380. If another packet from the same micro-flow currently is being processed, the processing on the new packet is not started 390 until the processing on the other packet in the same micro-flow is completed.

In one embodiment, the pre-processing to keep track of packets in a micro-flow 360 includes computing a pre-hash on the packets that currently are being processed. All packets that belong to the same micro-flow will produce the same hash number. These hash numbers are placed into a table. If the hash number of an incoming packet already exists in the table, that packet, which has the same hash number, therefore, potentially could belong to the same micro-flow, where a packet already is in one of the processors (or in one of the contexts in one of the processors). In one embodiment, before placing the packet in a context, a ready flag is reset to indicate that that packet cannot be processed. The ready flag will be set once the context that contained an earlier packet with the same hash number releases the flow block of that micro-flow. In one embodiment, which includes 16 processors with 4 contexts each, the pre-processor generates a set of 64 ready flags—one flag for each context—that indicates whether a particular context can be processed or not. When the processor is ready to process a certain context, the processor will look at the ready flag of the context, and if the ready flag is set, will skip to the next context.

In an embodiment of the present invention, the processor can generate other flags similar to the ready flags. These include the "free for the next Start Of Packet (SOP) packet" flags, the "free for the next End Of Packet (EOP) packet" flags, and the "done with the current flow block" flags. When a processor completes execution of all of the operations of one context and releases the flow block, the processor may indicate the completion of the execution to the pre-processor asserting the "done with the current flow block" flag. When the processor is ready to accept a new packet, the processor may indicate this readiness with the "free for the next SOP" flag. When the processor is ready to accept an EOP, the processor may indicate this readiness with the "free for the next EOP" packet. This mechanism can prevent a context from receiving other SOPs before the EOP has arrived.

The operation of embodiments of the present invention relating to variable time processes, such as lookups in a hash table and accessing off-chip memories and other asynchronous processes, is described in further detail below.

Lookups in a Hash Table:

A hash function is a many-to-one function that can be used to organize packets into tables. The purpose of hashing is to reduce the amount of storage required for the state information, while at the same time minimizing the search time. For example, an array of state information entries may be created, which is directly indexed by concatenating the packet header contents. This technique can be very efficient since this technique can require only one look-up. Such a technique, however, would need a prohibitive amount of memory since at any given time, only a very small subset of unique packet headers will need to be tracked. Alternatively, a linked list may be created, and the entire list could be searched each time by comparing the packet header to the state information in the list entry and following the link to the next entry until the match is found. This technique is a very space efficient approach since only the exact number of state information entries needs to be maintained. However, such an approach is extremely slow for searching if the list becomes long. The hash function of an embodiment of the present invention facilitates combining these two approaches by using the hash sum as an index into an array, where the array entry is a linked list (or tree). Now the linked list search is kept small (e.g., a couple of entries) as long as the array size is suitably large and the hash function has a good distribution across the array.

As mentioned above, the hash function is a many-to-one function. That is, the hash function performed on a particular packet may result in the same hash value as a totally unrelated packet. In one embodiment, this could be because the hashing is performed on information extracted from the headers of the packets, and the sum of individual bytes in two different headers yield the same value. After the hash value has been calculated, the hash value is used to search a data structure to locate the matching state information. The match is accomplished by comparing the header in the packet under operation with the contents of fields of the state information table. If the actual packet header matches the stored information, then a match is identified. Otherwise, some data structure (e.g., a linked list or a balanced tree) is traversed to repeat the comparison until a match is found.

Figure 6:
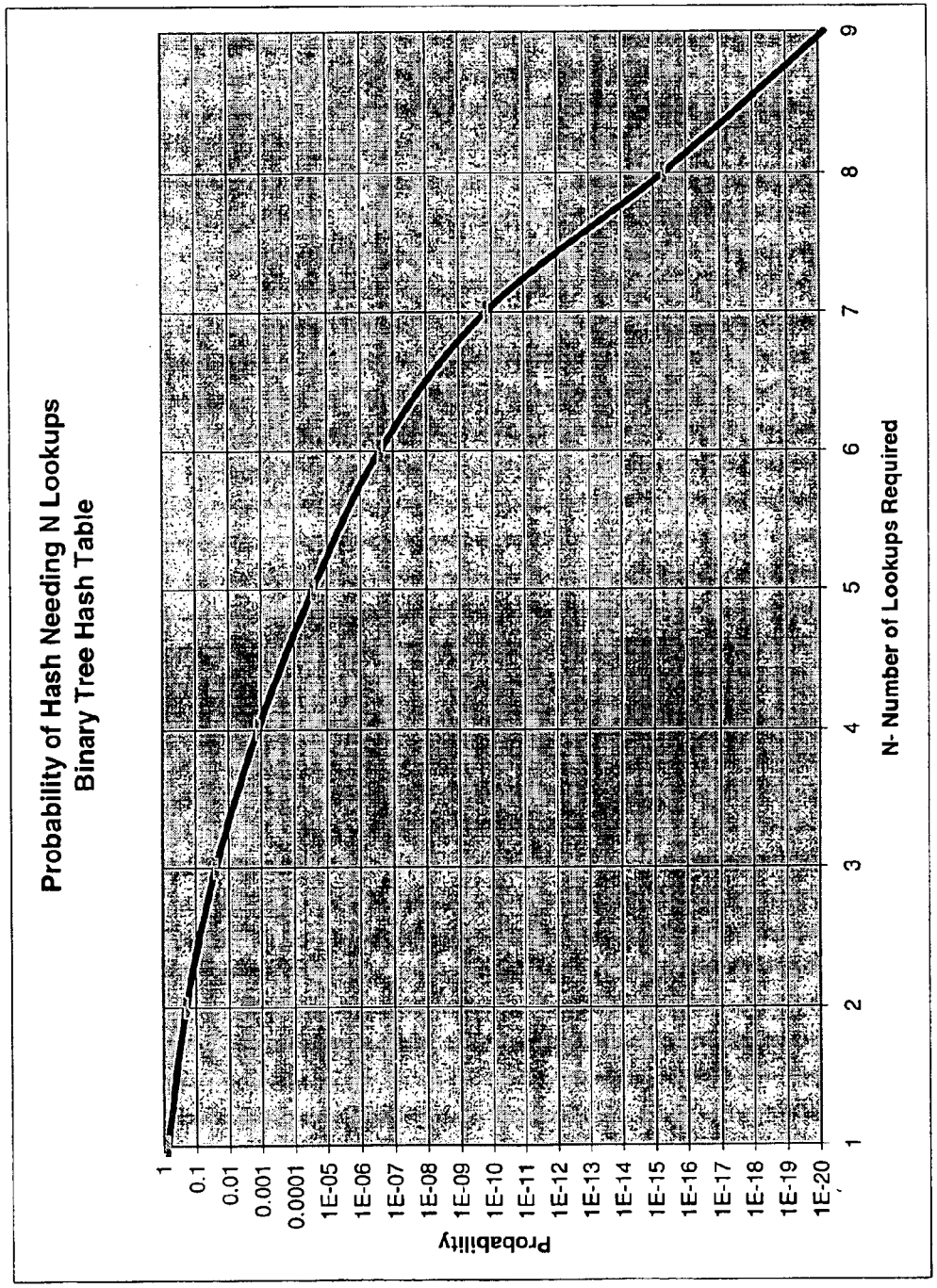
FIG. 6 is a graph illustrating the probability that a hash function requires N lookups before a match is found in an embodiment of the present invention.

The graph in FIG. 6 illustrates the probability that a hash function requires N look-ups before a match is found. It is, in fact, theoretically possible for a multi-million number of lookups to be required in order for a match is found. In other words, it could theoretically take an infinite amount of time for a lookup in a hash table. Therefore, if the lookups were to be performed employing either of the conventional methods described above, a maximum processing time of infinity would have to be tolerable. This maximum processing time clearly is not acceptable, and therefore the hash function cannot be employed by the conventional methods, especially in situations requiring small processing times, such as at the core of the Internet. Allocating a very long time to the processing of every single packet does not allow for the desired speed of the Internet. This unacceptable maximum processing time is a reason why, although hashing of data packets has been employed at the edge of the Internet (where the data traffic is less and thus slower processing speeds are acceptable), hashing of data packets has not been employed at the core of the Internet (where the data traffic is dense and faster processing is required).

Instead, conventional synchronous alternatives to the hash function have been employed. One of these alternatives involves the use of Content Addressable Memories (CAMs).

CAMs search in parallel through a large number of entries of a key. Their largest drawback is that they only can do a lookup through a small number of entries. CAMs thus are very expensive if implemented for a large number of packets. Another of these alternatives involves the use of Fixed Binary Searches. A Fixed Binary Search is an algorithm for searching for a specific entry in a table. In general, if N packets have to be looked through, it takes log N lookups. Thus, the average time taken to search through N packets is (log N)/2. This average time is substantially longer than the average time taken by a lookup in a hash table. However, although the times taken by both the CAM and the Fixed Binary Search are long, the times are fixed. Since conventional systems are unable to deal with variable times for at least the reasons described above, the conventional systems are forced to deal with the long times taken by these synchronous processes.

Returning to the lookups required for the hash function, it can be seen in FIG. 6 that although the number of lookups required for a hash theoretically can be very large, it is certain within a 1E-12 probability that the number of lookups required for a hash is less than 8. Practically, this translates into an "almost certainty" that less than 8 lookups will be needed for a hash function. Further, from analyzing FIG. 6 it can be seen that the expected value of the lookups is only 1.23. That is, on an average, the number of lookups required for a hash function is only 1.23. These value translates into time that is much less than the time taken by the above described conventional alternatives. Thus, by exploiting the much smaller expected value of the number of lookups required for a hash, rather than its significantly larger maximum possible value, the hash function can provide a far better alternative than its conventional synchronous counterparts. As described with reference to FIG. 3, the various embodiments of the present invention are based upon the average time required to perform a variable time process on a packet, rather than on the maximum possible time required to perform that variable time process on a packet.

Further, since, as mentioned above, variance decreases with the square-root of the number of objects being processed, performing hashing on a large number of packets in parallel, significantly can decrease the variance of the lookup process.

Accessing Off-Chip Memory

Another example of a variable-time process is accessing off-chip memory. It is to be noted that accessing on-chip memory also could be a variable-time process. However, the illustrative discussion that follows specifically focuses on accessing off-chip memory, since the variations in access time are most pronounced in this instance. The time taken to access off-chip a memory is variable for at least the reasons discussed below.

In one embodiment of the present invention, Double Data Rate (DDR) memory can be used. In DDR memories, data is switched on both the rising and the falling edge of the clock. Thus, a DDR SDRAM doubles the data rate of a regular SDRAM. DDR memories deliver high bandwidth and low-latency performance that is required to keep pace with the more advanced microprocessors and graphics subsystems. Off-chip memory is relatively slow and is variable due to the inherent characteristics of DDRs (bank select, chip select, Row Address Strobe/Column Address Strobe (RAS/CAS), etc.). So the amount of time to access a particular memory location may vary based on previous memory accesses (e.g., based on the state of the DDR memory). Also, the time may vary due to other memory accesses that are being performed concurrently (e.g., it may be faster to respond to another memory access due to the current state of the DDRAM). So the memory block is responsible for initiating the memory access operation and waiting for the memory access operation to complete.

Figure 7:
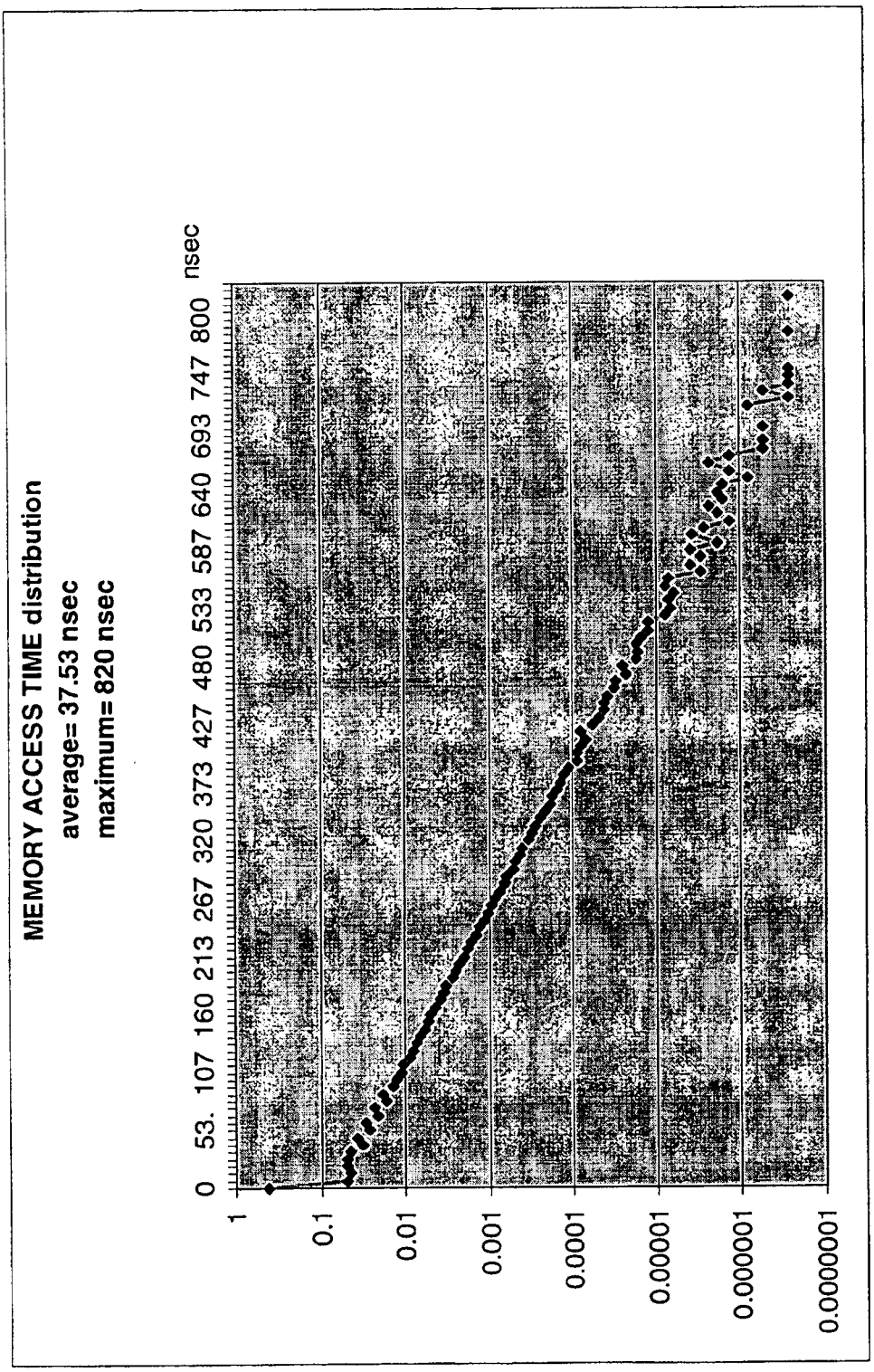
FIG. 7 is a graph illustrating the probability of accessing memory in a certain amount of time in an embodiment of the present invention.

The graph of a DDR memory function is shown in FIG. 7. It can be seen from FIG. 7 that memory access is a variable time process. In fact, there is a probability of $10^{-7}$ that 820 nanoseconds (ns) will be required for a memory access. However, the average time taken for a memory access is only 37.53 ns. Once again, as in the hash lookup case discussed above, in the case of memory access as well, the average or expected value is significantly less than the maximum possible value. Thus, exploiting the average value of the time required for memory access, as the different embodiments of the present invention do, is far more beneficial than allowing for the maximum possible processing time.

As mentioned earlier, in one embodiment, the processor can hold the context of the memory access request, so that the processor can process a different packet using another context, while waiting for the previous packet to get finished with its memory access.

Figure 8:
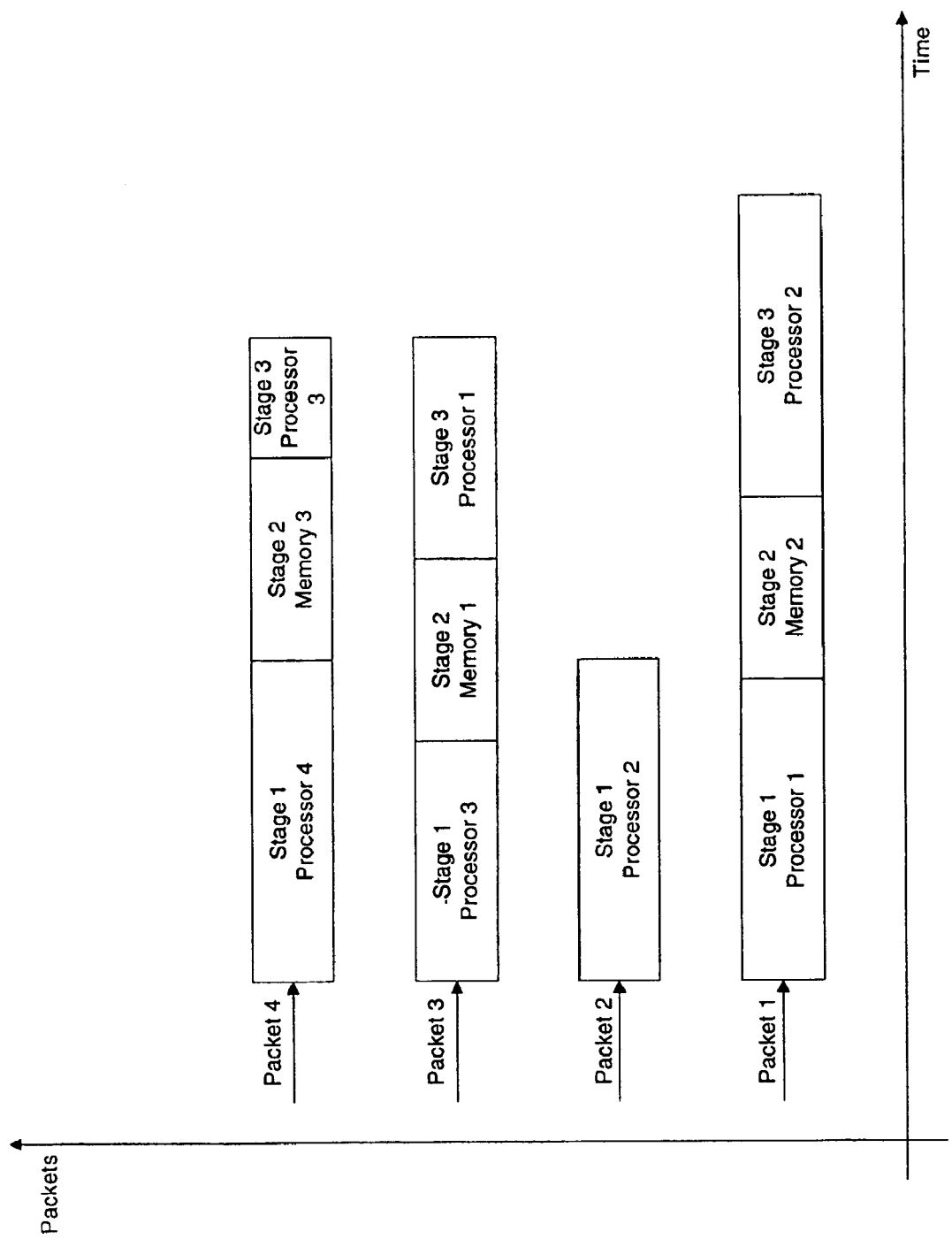
FIG. 8 is an illustration of an embodiment of the present invention including multiple processors as well as multiple memory blocks.

FIG. 8 pictorially illustrates an embodiment of the present invention, including multiple processors as well as multiple memory blocks. Here, a memory block is a unit of logic that handles the retrieval or storage of off-chip memory.

In this case:

$$\Sigma_{i=1\ldots n}(t_{packet\ processing\ time\ for\ packet\ i} + t_{memory\ access\ time\ for\ packet\ i})/n <= M \qquad \text{Eqn (3)}$$

In FIG. 8, it can be seen that the processing of a packet can be divided into "stages." In one embodiment, however, every processor is a general purpose processor, capable of performing every stage, and is not restricted to having the capability to perform only one stage. This ability of each of the processors to perform each of the stages, makes it possible to scale (increase or decrease) the number of stages without changing the logical grouping of operations.

Referring to FIG. 8 again, Packets 1–4 thus start out being processed in parallel on Processors 1–4 respectively. This is "Stage 1" for each of the packets, since each stage is defined as ending when the processing of the packet requires that a memory block be accessed. For instance, Packet 1 is processed by Processor 1 until a memory look-up is required, and Stage 1 of packet 1 ends. Packet 1 then is routed to the first memory block available at that time, Memory 2, for Stage 2 of the processing. Upon completion of Stage 2, Packet 1 needs a processor again, and is assigned, not necessarily to the processor Packet 1 was processed on earlier (that is Processor 1), but rather to the first available processor (which in this case is Processor 2). Packet 2, on the other hand, does not require a memory look-up at all. Therefore, the processing of Packet 2 comprises only one stage, and Packet 2 is completely processed by Processor 2.

In one embodiment, the processing of a packet may comprise the five stages of Instruction fetch, Instruction decoding and register access, Execution or memory address computation, Memory access, and Register write-back.

Figure 9:
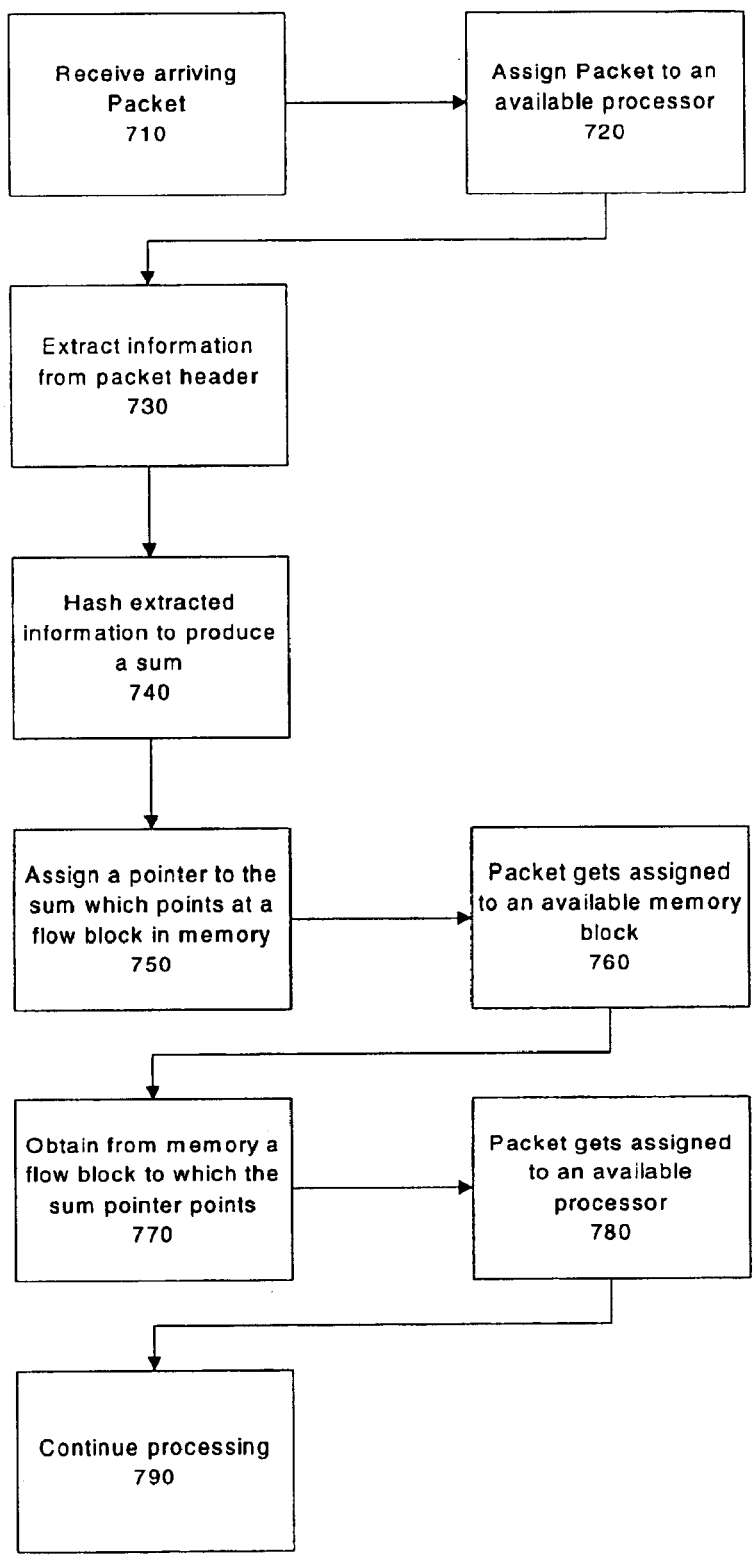
FIG. 9 is a flowchart illustrating one embodiment of the method of the present invention, which combines look-ups in a hash table and off-chip memory access.

An Embodiment that Combines Look-Ups in a Hash Table and Off-Chip Memory Access:

FIG. 9 is a flowchart that illustrates one embodiment combining look-ups in a hash table and off-chip memory access. Consider a packet, which arrives at the processing unit. A system in accordance with one embodiment of the present invention will first receive 710 the arriving packet. Next, the packet is assigned 720 to an available processor.

The processor identifies the protocol of the packet. Some examples of possible protocols include the Internet Protocol ("IP"), Asynchronous Transfer Mode ("ATM"), Frame Relay ("FR"), Multi-Protocol Label Switching ("MPLS"), and Ethernet. The assigned processor then extracts 730 information from the header of the packet. This extracted information varies with the kind of the packet protocol. For instance, for an IP packet, the extracted information is the "IP 5-tuple" which includes the IP source address, the IP destination address, the IP port source, the IP port destination, and the type of protocol (e.g. TCP, UDP, etc.).

The extracted information then is hashed 740 to produce a sum. A pointer then is assigned 750 to the sum, such that the pointer points to a flow block in memory. At this point, the packet gets assigned 760 to an available memory block. A flow block to which the sum points then is obtained 770 from memory. Now the packet once again is assigned 780 to an available processor in order to complete the remainder of the processing of the packet. In one embodiment, this processor may be the same processor that previously processed the packet. In another embodiment, this processor may be a different one. Each of these alternatives is feasible, as long as the processor to which the packet is being assigned 780 has access to the context of the packet stored earlier.

At this assigned processor 780, the processing of the packet is continued 790. In this embodiment, a "stage" of processing, as discussed above with reference to FIG. 8, may be defined as all the processing that needs to be performed before access to an off-chip memory is required. Further, in this embodiment, a tracking of whether a packet in a particular flow is being processed may be implemented, as described above with reference to FIG. 5.

Use of Multiple Processors:

In order to implement a system that is operable as illustrated in FIG. 3 or FIG. 6, it is desirable to determine the number of processors (N) that should be employed in parallel, in order to obtain an acceptable average rate of processing of the packets. In one embodiment, the incoming packets can be modeled as an exponential distribution (M/M/1), which provides a good approximation of packets in a queue, waiting to be processed. Assume that one "packet time" is the time taken for a packet to be received at the processing unit. That is, a packet time reflects the speed at which packets are being received at the processor. In such an embodiment, $$(A/N)^N = P \qquad \text{Eqn. (4)}$$

where

A=the average number of packet times that a processor takes to finish processing a packet, N=the number of processors to be employed, and P=the probability that N processors would not be sufficient for purposes of processing the received packets.

Here, (A/N) indicates the utilization of each of the N processors. So the utilization of all of the N processors is $(A/N)^N$. This utilization in turn should be equal to the probability with which it is acceptable that N processors would not be sufficient for purposes of processing the received packets at the desired rate. In one embodiment, this probability P is chosen to be such a small probability that for practical purposes N processors will almost always suffice to process the incoming packets at the desired rate. Once an appropriate value of P is chosen, equation (4) above can be solved for N, since A is known or can be experimentally determined.

In another embodiment, each processor, which is employed, may have multiple contexts. In such an embodiment, where the processors can process all of these contexts within the time available:

$$[A/(N*C)]^{(N*C)} = P \qquad \text{Eqn. (5)}$$

where

C=the number of contexts in each processor.

In yet another embodiment, an input buffer may be used to receive the incoming packets. The input buffer may be First In First Out (FIFO). In such an embodiment, $$(A/N)^{(N+J)} = P \qquad \text{Eqn. (6)}$$

Combining two of the above embodiments, another embodiment includes multiple contexts on each processor, as well as an input buffer. In such an embodiment:

$$[A/(N*C)]^{((N*C)+J)} = P \qquad \text{Eqn. (7)}$$

where

J=number of packets that can be stored in the input buffer at one time.

In one embodiment of the present invention, a continuous stream of 40-byte packets belonging to a single flow at Optical Connect- (OC-) 192 rate may be received. In this case the time to process each packet is 32 nanoseconds (ns). With processors operating at 266 MHz, this time amounts to 8 cycles. That is, the value of A in such an embodiment is about 8. In one embodiment, P is 1E-12. That is, if there is only a probability of 1E-12 that N processors are not sufficient for processing the received packets at the desired rate, this is acceptable. This is because 1E-12 is such a small probability that for practical purposes it is essentially assured that N processors will almost always suffice to process the incoming packets at the desired rate. It should be noted that these values can be selected to be any other values, and that the numbers above are just illustrative examples. In this embodiment, according to equation (4), N is 16. In accordance with equation (5), N is 16 and C is 4. In accordance with equation (6), N is 16, and J is 1. In accordance with equation (7), N is 16, C is 4 and J is 1. In summary, these figures provide a high probability that scheduler 817 will handle packets in a reasonable amount of time.

Once the number of processors to be used has been determined, and that number of processors has been employed, a system in accordance with the present invention assigns packets to a specific processor. Further, if each processor runs multiple contexts, the system assigns packets to a particular context in a specific processor. In one embodiment, these assignments are handled together by a processor scheduler.

Figure 10:
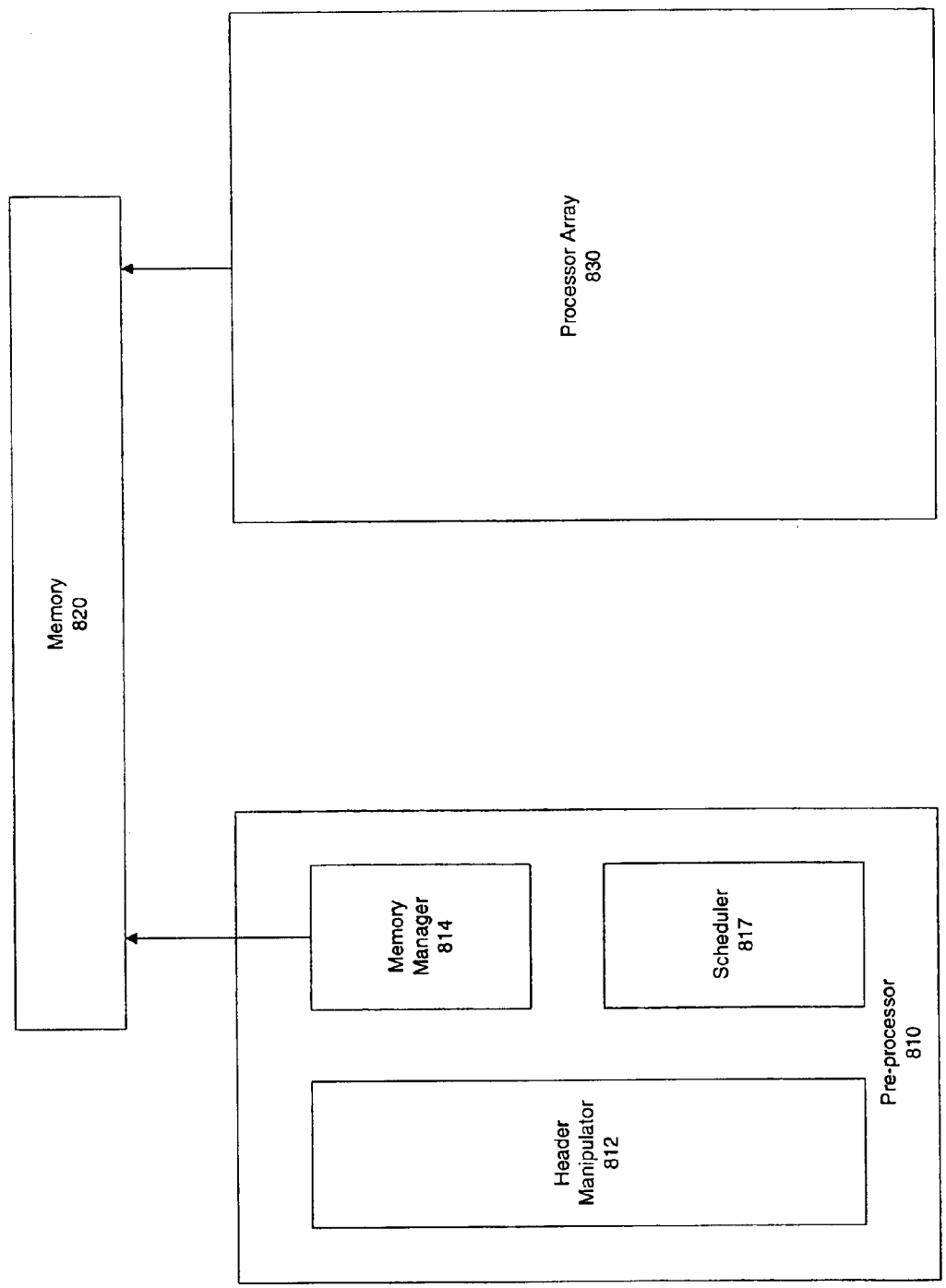
FIG. 10 is a pictorial illustration of a system in accordance with one embodiment of the present invention.

FIG. 10 illustrates one embodiment of a system 800 in accordance with the present invention. The system 800 comprises a pre-processor 810, a memory 820, and a processor array 830. The pre-processor 810 in turn comprises a header manipulator 812 and a memory manager 814 and a scheduler 817.

The pre-processor 810 performs pre-processing on the incoming packets so as to lock-in their order, and to thus ensure maintenance of their order after processing is completed. The header manipulator 812 receives each incoming packets and performs a hash on its header and creates a hash value. An alternative embodiment is to utilize the hash key (e.g. a tuple constructed of protocol source, destination address, protocol type, source port and destination port). As discussed above, this hash value then can be checked against the hash value of all the packets currently being processed in the processor array 830. Header manipulator 812 then forwards the body of the packet to the memory manager and the header to the scheduler 817. If a packet with the same hash value is currently being processed in the processor array 830, the scheduler 817 does not schedule the incoming packet.

The memory manager 814 stores the body to memory 820. The header of the incoming packet, the hash value, and a pointer to the memory 820 location where the body of the packet is stored are sent by the scheduler 817 to the processor array 820. The processor array 830 comprises of several processors, which then process the incoming packets.

While the present invention has been particularly shown and described with reference to various embodiments, it should be noted that various changes in form and details can be made therein without departing from the spirit and scope of the invention.

I claim:

1. A method for performing variable time processes in parallel on a plurality of ordered incoming packets, on a plurality of processors, the method comprising:

assigning each of the plurality of ordered incoming packets to one of the plurality of processors, the packets comprising at least a portion of a micro-flow;

pre-processing each of the plurality of ordered incoming packets to determine whether processing on a previous packet is in progress, the previous packet comprising at least a portion of the micro-flow; and processing each of the plurality of ordered incoming packets on the a processor of the plurality of processors to which the ordered incoming packet is assigned, in response to completion of processing of the previous packet.

2. The method of claim 1, wherein the plurality of ordered incoming packets comprise a plurality of data packets in a network.

3. The method of claim 1, wherein the processing further comprises:

extracting information from a header of each of the plurality of ordered incoming packets;

hashing the extracted information for each of the ordered incoming packets;

storing the hashed information; and responsive to receipt of a new packet, comparing the hash of the extracted information for the new packet with the stored information.

4. The method of claim 1 wherein the assigning comprises:

selecting one of the plurality of processors which is free to process one of the plurality of ordered incoming entities packets at the time that the one of the plurality of ordered incoming entities packets is received.

5. The method of claim 1, wherein the pre-processing further comprises:

determining whether a first in the plurality of ordered incoming entities is currently being processed at the time when a subsequent one of the plurality of ordered incoming packets is received;

responsive to determining that the first in the plurality of ordered incoming packets is currently being processed:

not starting processing of the subsequent one of the plurality of ordered incoming packets;

redetermining at a later time whether the first in the plurality of ordered incoming packets is currently being processed; and responsive to determining that the first in the plurality of ordered incoming packets is not currently being processed, starting processing of the subsequent one of the plurality of ordered incoming packets.

6. A method to process in parallel on a plurality of processors, a plurality of packets in a network which comprise a micro-flow, the method comprising:

assigning each of the plurality of packets to one of the plurality of processors;

determining whether a first packet in the plurality of packets comprising the micro-flow is currently being processed at the time when a subsequent packet of the plurality of packets comprising the micro-flow is received;

responsive to determining that the first packet in the plurality of packets is currently being processed:

not starting processing of the subsequent packet of the plurality of packets;

at a later time determining whether the first packet in the plurality of packets is currently being processed;

responsive to determining that the first packet in the plurality of packets is not currently being processed, starting processing of the subsequent em packet of the plurality of packets; and processing each of the plurality of packets on a processor of the plurality of processors to which the packet is assigned.

7. An electronically readable medium storing a program for permitting a computer to perform a method to process in parallel on a plurality of processors, a plurality of packets in a network which comprise flows micro-flow, the method comprising:

assigning each of the plurality of packets to one of the plurality of processors;

determining whether a first packet in the plurality of packets comprising the micro-flow is currently being processed when a subsequent packet in the plurality of packets comprising the micro-flow is received;

responsive to determining that the first packet in the plurality of packets is currently being processed:

not starting processing of the subsequent one packet of the plurality of packets;

redetermining at a later time whether the first packet in the plurality of packets is currently being processed;

responsive to determining that the first packet in the plurality of packets is not currently being processed, starting processing of the subsequent packet of the plurality of packets; and processing each of the plurality of packets on the corresponding one a processor of the plurality of processors to which it the packet is assigned.

* * * * *

UNITED STATES PATENT AND TRADEMARK OFFICE
CERTIFICATE OF CORRECTION

PATENT NO. : 6,854,117 B1
APPLICATION NO. : 09/703196
DATED : February 8, 2005
INVENTOR(S) : Lawrence G. Roberts It is certified that error appears in the above-identified patent and that said Letters Patent is hereby corrected as shown below:

Column 13,
Lines 55 and 56, delete "entities".

Column 14,
Line 19, delete "at the time".
Line 32, delete "em".
Line 40, replace "flows" with -- a --.
Line 51, delete "one".
Line 59, delete "the".
Line 60, delete "corresponding one".
Line 61, delete "it".

Signed and Sealed this

Twentieth Day of June, 2006

JON W. DUDAS
*Director of the United States Patent and Trademark Office*